(12) United States Patent
Kaltenbach et al.

(10) Patent No.: US 9,399,394 B2
(45) Date of Patent: Jul. 26, 2016

(54) GEARBOX AND DRIVE TRAIN WITH A GEARBOX

(71) Applicant: ZF Friedrichshafen AG, Friedrichshafen (DE)

(72) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 39 days.

(21) Appl. No.: 14/363,497

(22) PCT Filed: Nov. 5, 2012

(86) PCT No.: PCT/EP2012/071785
§ 371 (c)(1),
(2) Date: Jun. 6, 2014

(87) PCT Pub. No.: WO2013/083337
PCT Pub. Date: Jun. 13, 2013

(65) Prior Publication Data
US 2014/0349799 A1    Nov. 27, 2014

(30) Foreign Application Priority Data
Dec. 8, 2011 (DE) .......................... 10 2011 087 995

(51) Int. Cl.
*B60K 6/365* (2007.10)
*B60K 6/42* (2007.10)
(Continued)

(52) U.S. Cl.
CPC . *B60K 6/42* (2013.01); *B60K 6/365* (2013.01); *B60K 6/48* (2013.01); *B60L 11/123* (2013.01);
(Continued)

(58) Field of Classification Search
CPC ............ F16H 3/728; F16H 2200/2094; F16H 2200/2097; B60K 6/365; B60K 6/42; B60K 6/48; B60K 2006/4816; B60K 2006/4841
See application file for complete search history.

(56) References Cited

U.S. PATENT DOCUMENTS 6,592,484 B1    7/2003    Tsai et al.
2003/0199352 A1    10/2003    Tsai et al.
(Continued)

FOREIGN PATENT DOCUMENTS

DE    10 2005 057930 A1    2/2007
DE    10 2009 024625 a1    12/2010

OTHER PUBLICATIONS

Office Action issued in corresponding DE Appln. No. 10 2011 087 995.1 on Dec. 3, 2013 (5 pgs).
(Continued)

*Primary Examiner* — Huan Le
(74) *Attorney, Agent, or Firm* — Brinks Gilson & Lione (57) ABSTRACT

A transmission for a motor vehicle, the transmission comprising a housing, a transmission input shaft operable to couple to and decouple from a drive assembly of the motor vehicle, a transmission output shaft operable to couple to and decouple from an axle drive of the motor vehicle, a first element of a first planetary gear set permanently coupled to a first element of a second planetary gear set via a shiftable intermediate shaft between the transmission input shaft and the transmission output shaft, wherein the second planetary gear set is disposed behind the first planetary gear set, an electric machine permanently coupled to the intermediate shaft, a second element of the second planetary gear set permanently coupled to the transmission output shaft, a first form-locking shift element of the transmission input shaft, and a second form-locking shift element of the transmission output shaft.

12 Claims, 6 Drawing Sheets

(51) Int. Cl.
*B60K 6/48* (2007.10)
*F16H 3/72* (2006.01)
*B60L 11/12* (2006.01)
*B60L 11/14* (2006.01)
*B60L 15/20* (2006.01)

(52) U.S. Cl.
CPC ............. *B60L 11/14* (2013.01); *B60L 15/2054* (2013.01); *F16H 3/728* (2013.01); *B60K 2006/4816* (2013.01); *B60K 2006/4841* (2013.01); *B60L 2240/12* (2013.01); *B60L 2240/421* (2013.01); *B60L 2240/441* (2013.01); *B60L 2240/486* (2013.01); *F16H 2200/0021* (2013.01); *F16H 2200/2007* (2013.01); *F16H 2200/2064* (2013.01); *F16H 2200/2094* (2013.01); *F16H 2200/2097* (2013.01); *Y02T 10/6217* (2013.01); *Y02T 10/6221* (2013.01); *Y02T 10/6256* (2013.01); *Y02T 10/645* (2013.01); *Y02T 10/7077* (2013.01); *Y02T 10/72* (2013.01); *Y02T 10/7275* (2013.01); *Y10S 903/902* (2013.01)

(56) References Cited

U.S. PATENT DOCUMENTS

| | | |
|---|---|---|
| 2008/0318721 A1 | 12/2008 | Oba et al. |
| 2009/0170649 A1* | 7/2009 | Murakami et al. ............... 475/5 |
| 2009/0186735 A1 | 7/2009 | Iwanaka et al. |
| 2010/0018789 A1* | 1/2010 | Oba et al. ................. 180/65.235 |
| 2010/0032218 A1* | 2/2010 | Ideshio et al. ........... 180/65.225 |
| 2010/0109162 A1 | 5/2010 | Hwang |
| 2012/0310461 A1* | 12/2012 | Maruyama et al. ............ 701/22 |

OTHER PUBLICATIONS

International Search Report from PCT/EP2012/071785 dated Jan. 23, 2013 (English Translation) (2 pgs).
International Search Report and Written Opinion from PCT/EP2012/071785 dated Jan. 23, 2013 (German Language) (10 pgs).

* cited by examiner

GEARBOX AND DRIVE TRAIN WITH A GEARBOX

This application is a filing under 35 U.S.C. §371 of International Patent Application PCT/EP2012/071785, filed Nov. 5, 2012, and claims the priority of DE 10 2011 087 995.1, filed Dec. 8, 2011. These applications are incorporated by reference herein in their entirety.

The invention relates to a transmission for a motor vehicle according to the preamble of Claim 1. Furthermore, the invention relates to a drive train for a motor vehicle having a transmission of this type.

A number of different transmissions for motor vehicles are known in the field, such as automatic shifting transmissions and automated shifting transmissions, for example, normally having numerous friction-locking shift elements designed as clutches or brakes, and/or form-locking shift elements designed as claw clutches. Transmissions of this type have, to a certain extent, a relatively complex structure, due to the numerous shift elements incorporated therein. There is a demand for simpler transmissions, which can be used in so-called plug-in hybrid vehicles, or so-called plug-in electric vehicles.

Based on this, the present invention addresses the objective of creating a novel transmission for a motor vehicle, and a drive train having a transmission of this type. This objective is attained by means of a transmission according to Claim 1. According to the invention, a first element of a first planetary gear set is permanently coupled to a first element of a second planetary gear set via a shiftable intermediate shaft between the transmission input shaft and the transmission output shaft, wherein an electric machine is permanently coupled to this intermediate shaft, wherein a second element of the second planetary gear set is permanently coupled to the transmission output shaft, wherein, in a first shifting setting of a first form-locking shift element, the transmission input shaft is coupled directly to the transmission output shaft, in contrast to which, in a second shifting setting of the first form-locking shift element, the transmission input shaft is coupled to a second element of the first planetary gear set, and wherein, in a first shifting setting of a second form-locking shift element, a third element of the second planetary gear set is connected firmly to the housing, in contrast to which, in a second shifting setting of the second form-locking shift element, the third element of the second planetary gear set is coupled to the second element or to the first element of the second planetary gear set, and accordingly, the second planetary gear set is bypassed in a block cycle.

The transmission according to the invention has, in the simplest case, exclusively two planetary gear sets, or planetary gear steps, respectively, and two shift elements, wherein the two shift elements are preferably designed as double shift elements, having at least two engaged shifting settings. With a transmission of this type, two gears can be provided for the electric machine, which is permanently coupled to an intermediate shaft of the transmission, and at least three gears are provided for a separate drive assembly, comprising an internal combustion engine and/or an additional electric machine, wherein the shift elements can each be power shifted, such that, accordingly, during the shifting of the shift elements, a tractive force can be provided at the transmission output shaft. A transmission of this type is suitable, preferably, for use in plug-in hybrid vehicles or plug-in electric vehicles.

According to a first advantageous development of the invention, a third element of the first planetary gear set is permanently connected to the housing. The transmission then provides two gears for the electric machine, which is permanently coupled to the intermediate shaft, and three gears for the drive assembly. According to this development of the invention, only two form-locking shift elements, designed as double shift elements, are necessary, thus resulting in a particularly simple construction of the transmission.

According to a second, alternative, advantageous development of the invention, a third form-locking shift element is present, wherein, in a first shifting setting of the third shift element, a third element of the first planetary gear set is firmly connected to the housing, and wherein, in a second shifting setting of the third shift element, the third element of the first planetary gear set is coupled to the second element of the first planetary gear set. The transmission then provides two gears for the electric machine permanently coupled to the intermediate shaft, and four gears for the drive assembly. According to the this development of the invention, the transmission has three form-locking shift elements, designed as double shift elements, resulting in being able to provide a higher number of gears for the drive assembly than with the development in which the transmission has only two form-locking shift elements designed as double shift elements.

The second form-locking shift element is then connected between the first shifting setting and the second shifting setting, preferably for ensuring a shifting without tractive force interruption, when the drive assembly provides tractive force to the transmission output shaft. The first form-locking shift element is then connected between the first shifting setting and the second shifting setting, and/or the third form-locking shift element is then connected between the first shifting setting and the second shifting setting, preferably for ensuring a shifting without tractive force interruption, when the electric machine, which is permanently coupled to the intermediate shaft, provides tractive force to the transmission output shaft. The execution of shiftings, without tractive force interruption, by the form-locking shift element is particularly preferred, and enables a particularly advantageous operation of a motor vehicle having the transmission according to the invention.

According to a first advantageous variation, the transmission input shaft and the transmission output shaft are disposed coaxially behind one another, wherein the intermediate shaft, to which the electric machine is permanently coupled, is disposed, at least in sections, coaxially surrounding the transmission output shaft. This variation is particularly suitable when the transmission is to be used in a standard drive train configuration, in which the transmission is installed in the longitudinal direction of the motor vehicle, thus when the transmission input shaft and the transmission output shaft extend in the longitudinal direction of the motor vehicle.

According to a second advantageous variation, the transmission output shaft is disposed, at least in sections, coaxially surrounding an additional intermediate shaft, wherein the intermediate shaft, to which the electric machine is permanently coupled, is likewise disposed, at least in sections, coaxially surrounding the additional intermediate shaft, which is disposed coaxially behind the transmission input shaft. This variation of the invention is then particularly suitable when the transmission is installed transversely in the vehicle, i.e. when the transmission input shaft and the transmission output shaft run transversely to the longitudinal direction of the motor vehicle.

The drive train for a motor vehicle according to the invention is defined in Claim 12.

Preferred developments of the invention can be derived from the dependent Claims and the following description.

Embodiment examples of the invention shall be explained in greater detail based on the drawings, without being limited thereto. Shown are.

The present invention relates to a transmission for a vehicle, in particular for a plug-in hybrid vehicle, or a plug-in electric vehicle. Furthermore, the transmission relates to a drive train for a motor vehicle having a transmission of this type.

Figure 1:
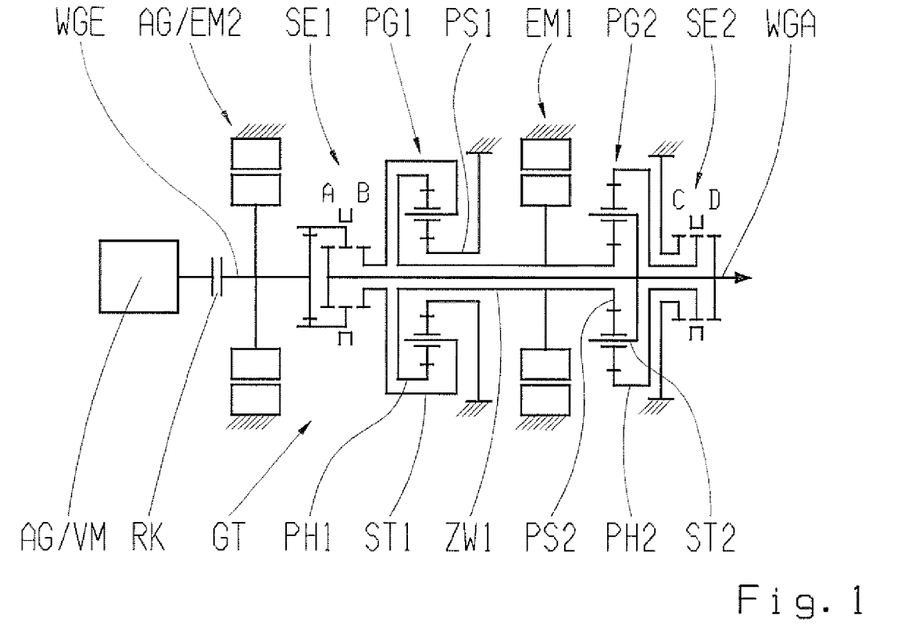
FIG. 1 a diagram of a first transmission according to the invention, together with one internal combustion engine and two electric machines.

FIG. 1 shows a first embodiment example of a transmission GT according to the invention, wherein the transmission GT has a transmission input shaft WGE and a transmission output shaft WGA. A drive assembly AG can be coupled to the transmission input shaft WGE, and an axle drive, not shown in FIG. 1, can be coupled to the transmission output shaft WGA. In the embodiment example in FIG. 1, the drive assembly AG comprises an internal combustion engine VM and an electric machine EM2.

In the embodiment example in FIG. 1, the transmission GT comprises two planetary gear sets PG1 and PG2, disposed coaxially behind one another, which can also be referred to as planetary gear steps, and two form-locking shift elements SE1 and SE2. A first element of a first planetary gear step PG1, specifically, according to FIG. 1, the ring gear PH1 of the first planetary gear step PG1, is permanently coupled to a first element of a second planetary gear step PG2, specifically, according to FIG. 1, to the sun gear PS2 of the second planetary gear step PG2, via an intermediate shaft ZW1, that can be connected between the transmission input shaft WGE and the transmission output shaft WGA, wherein an electric machine EM1 is permanently coupled to this intermediate shaft ZW1.

The two shift elements SE1 and SE2 are, according to FIG. 1, designed as double shift elements, each of which has two engaged shifting settings, and one disengaged, or neutral, shifting setting. The two engaged shifting settings of the first shift element SE1 concern the shifting settings A and B, and both engaged shifting settings of the second shift element SE2 concern the shifting settings C and D.

Then, when the first shift element SE1 assumes the first shifting setting A, or then, when the first shifting setting A of the first shift element SE1 is engaged, the transmission input shaft WGE is coupled directly to the transmission output shaft WGA. Then, in contrast, when the second shift setting B of the first form-locking shift element SE1 is engaged, the transmission input shaft WGE is coupled to a second element of the first planetary gear step PG1, specifically, in FIG. 1, to the carrier ST1 of the first planetary gear step PG1.

A second element of the second planetary gear step PG2, specifically, according to FIG. 1, the carrier ST2 of the second planetary gear step PG2, is permanently coupled to the transmission output shaft WGA.

Figure 2:
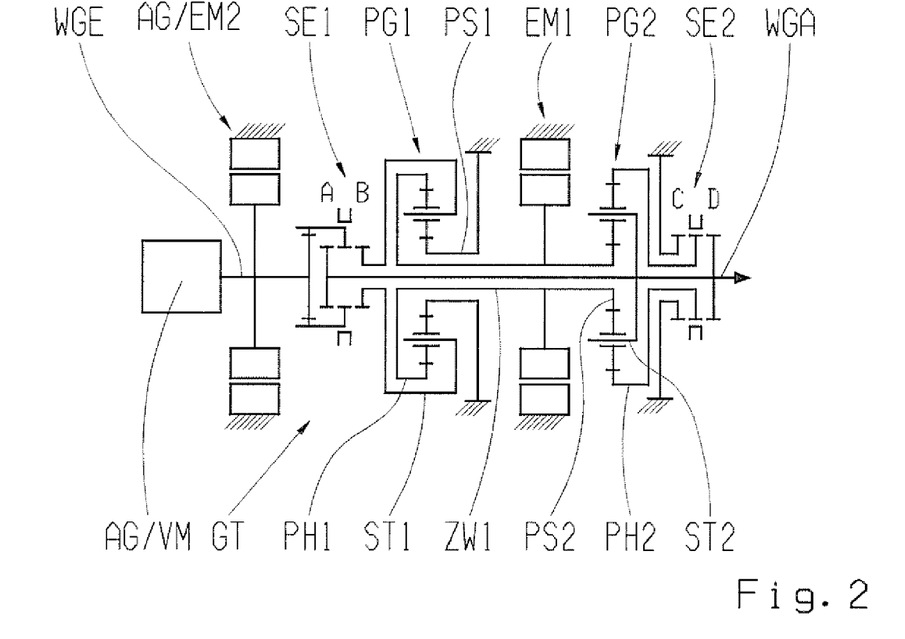
FIG. 2 a diagram of a second transmission according to the invention, together with one internal combustion engine and two electric machines.

Then, when the first shifting setting C is engaged at the second form-locking shift element SE2, a third element of the second planetary gear step PG2, specifically, in FIG. 2, the ring gear PH2 of the second planetary gear step PG2, is firmly connected to the housing. Then, in contrast, when the second shifting setting D of the second shift element SE2 is engaged, the third element of the second planetary gear step PG2, specifically, in FIG. 1, the ring gear PH2 thereof, is coupled to the second element of the second planetary gear step PG2, specifically, in FIG. 1, to the carrier ST2 of the second planetary gear step PG2, and thus to the transmission output shaft WGA, or, alternatively, to the first element, or the sun gear PS2, respectively. Then, when the second shift element SE2 assumes the second shifting setting D, it is then, in any case, bypassed, and is in a block cycle.

A third element of the first planetary gear step PG1, specifically, according to FIG. 1, the sun gear PS1 of the first planetary gear step PG1, it is, according to FIG. 1, permanently firmly connected to the housing.

The transmission GT in FIG. 1 has, accordingly, the two planetary gear steps PG1 and PG2, as well as the two form-locking shift elements SE1 and SE2, designed as double shift elements. The second planetary gear step PG2 generates two gears for the electric machine EM1, which is permanently coupled to the intermediate shaft ZW1, specifically, a first gear having a first gear ratio, in the shifting setting C of the second shift element SE2, and a second gear having a second gear ratio, in the shifting setting D of the second shift element SE2.

Because, as has already been mentioned, when the second shifting setting D is engaged, the second shift element SE2 of the second planetary gear step PG2 is bypassed, then the second shift element provides a direct gear ratio, or a direct gear, respectively, when the second shifting setting D is engaged, as a second gear for the electric machine EM1, which is permanently connected to the intermediate shaft ZW1.

Aside from these two gears for the electric machine EM1, which is permanently coupled to the intermediate shaft ZW1, the transmission GT in FIG. 1 provides three gears for the drive assembly AG. Then, when the second shifting setting B is engaged in the first shift element SE1, the first planetary gear step PG1 provides a so-called overdrive gear ratio for the drive assembly AG, wherein this gear ratio provides a first gear for the drive assembly AG with the gear ratio of the second planetary gear step PG2, with the gear ratio shifted for this in series, when the first shifting setting C is engaged at the second shift element SE2, or a third gear for the drive assembly AG, when the second shifting setting D is engaged at the second shift element SE2.

Then, when the first shifting setting A is engaged at the first shift element SE1, the drive assembly AG is coupled directly to the transmission output shaft WGA, wherein this direct gear provides the second gear for the drive assembly AG. This second gear is independent of the second planetary gear step PG2, as a result of which, by means of the second planetary gear step PG2, it is then possible to shift, without load, in the background.

The shifting settings C and D of the second shift element SE2 are preferably actively synchronized, in an operation that is regulated in terms of the rotational rate, via the electric machine EM1, which is permanently coupled to the intermediate shaft ZW1. The shifting settings A and B of the first shift element SE1 can be synchronized by various means. As such, it is possible to synchronize these by means of regulating the rotational rate of the transmission input shaft WGE, this being via the drive assembly AG, specifically, in FIG. 1, via the internal combustion engine VM and/or the electric machine EM2.

Then, when a friction-locking clutch RK is allocated to the transmission input shaft WGE, as shown in FIG. 1, this synchronization can also occur via a slippage mode of the friction clutch RK.

If this friction clutch is disposed directly upstream of the shift element SE1 (see, in particular, FIGS. 4 and 5), then this synchronization can occur in the shifting settings A and B, when the friction clutch RK is disengaged, by means of a synchronized shift element.

Then, when a shifting at the first shift element SE1, between the shifting settings A and B, is carried out, the electric machine EM1, which is permanently coupled to the intermediate shaft ZW1, can provide a tractive force to the transmission output shaft WGA, in order to thus ensure a shifting of the first shift element SE1 without tractive force interruption. Likewise, a shifting without tractive force interruption between the shifting settings C and D can be implemented at the second shift element SE2, specifically when the drive assembly provides a tractive force to the transmission output shaft WGA, for which the first shifting setting A is engaged at the first shift element SE1.

Then, when exclusively at the first shift element SE1, the second shifting setting B is engaged, and the second shift element SE2 assumes a neutral shifting setting, thus, neither the first shifting setting C, nor the second shifting setting D, are engaged, the internal combustion engine VM of the drive assembly AG can be started via the electric machine EM1. Furthermore, a charging mode via the electric machine EM1 is then possible, independently of the driving speed.

With an electric machine EM1 rotating in the reverse direction, a reverse driving can be implemented.

Furthermore, with the transmission according to FIG. 1, a purely electrical driving mode via both electric machines EM1 and EM2 can be implemented when the friction clutch RK is disengaged, wherein both electric machines EM1 and EM2 then provide a drive torque to the transmission output shaft WGA.

Furthermore, power shiftings are possible with the transmission in FIG. 1, during the purely electrical driving mode, when the friction clutch RK is disengaged, specifically, power shiftings between the shifting settings C and D of the second shift element SE2, wherein, then the electric machine EM2 provides a drive torque to the transmission output shaft WGA when the shifting setting A is engaged at the shift element SE1. In this case, the gear for the electric machine EM1 is then shifted.

Preferred shifting setting combinations of the shifting settings A, B, C, and D of the form-locking shift elements SE1 and SE2 are listed in the following shifting table, wherein the shifting table also lists the two gear ratios i-AG and i-EM1 for the drive assembly AG and the electric machine EM1, specifically for a numerical example, in which the first planetary gear step PG1 has a stationary transmission ratio i0 of −2.3 and the second planetary gear step PG2 has a stationary transmission ratio i0 of −1.5.

| A | B | C | D | i-AG | i-EM1 | |
|---|---|---|---|------|-------|---|
| — | x | x | — | 1.74 | 2.5 | Gear 1 for VM/EM2. EM1 supports tractive force during shifting B-A at shift element SE1. |
| x | — | x | — | 1.0 | 2.5 | Gear 2 for VM/EM2. EM1 synchronizes shifting C-D at shift element SE2. |
| x | — | — | x | 1.0 | 1.0 | Gear 2 for VM/EM2. EM1 supports tractive force during shifting A-B at shift element SE1. |
| — | x | — | x | 0.7 | 1.0 | Gear 3 for VM/EM2. |
| — | x | — | — | | | Neutral. VM start via EM1 possible. Charging in neutral possible. |

In the table above, the symbol "x" indicates that the respective shifting setting is engaged, while the symbol "-" indicates that the respective shifting setting is disengaged.

The transmission GT in FIG. 1 has a lower first gear for the electric machine EM1, which is permanently coupled to the intermediate shaft ZW1, than for the internal combustion engine VM. As a result, the electric machine EM1 can serve as a start-up element, and provide a sufficiently powerful start-up element.

The internal combustion engine VM is primarily needed at higher driving speeds and higher driving performances, for which reason the higher transmission ratios for the internal combustion engine VM are advantageous. The range of lower driving speeds, which lie beneath the driving range of the first gear for the internal combustion engine VM, can be covered purely electrically with the electric machine EM1, which is permanently coupled to the intermediate shaft ZW1. The electrical energy needed for this is provided by either an electrical energy storage unit, or by an electric machine EM2 of the drive assembly AG that is operated as a generator by the internal combustion engine VM.

FIG. 2 shows a variation of the transmission GT in FIG. 1, in which the transmission input shaft WGE does not have a friction clutch RK. The friction clutch RK, which is connected in FIG. 1 between the internal combustion engine VM of the drive assembly AG and the transmission input shaft WGE, concerns, accordingly, an optional structural assembly. Accordingly, in FIG. 2, not only the electric machine EM2 of the drive assembly AG, but also the internal combustion engine VM of the drive assembly AG, are permanently connected to the transmission input shaft WGE. In this case, the drive assembly AG can be decoupled, or coupled, respectively, from, or to, the transmission output shaft WGA.

In the variation in FIG. 2, in a purely electrical driving mode, the shifting at the second shift element SE2 for a gear change in the electric machine EM2 is subjected to a tractive force interruption. Furthermore, in the variation in FIG. 2, at low driving speeds, a serial driving operation can be provided, in which the electric machine EM2 of the drive assembly AG generates an electrical current for powering the electric machine EM1.

Figure 3:
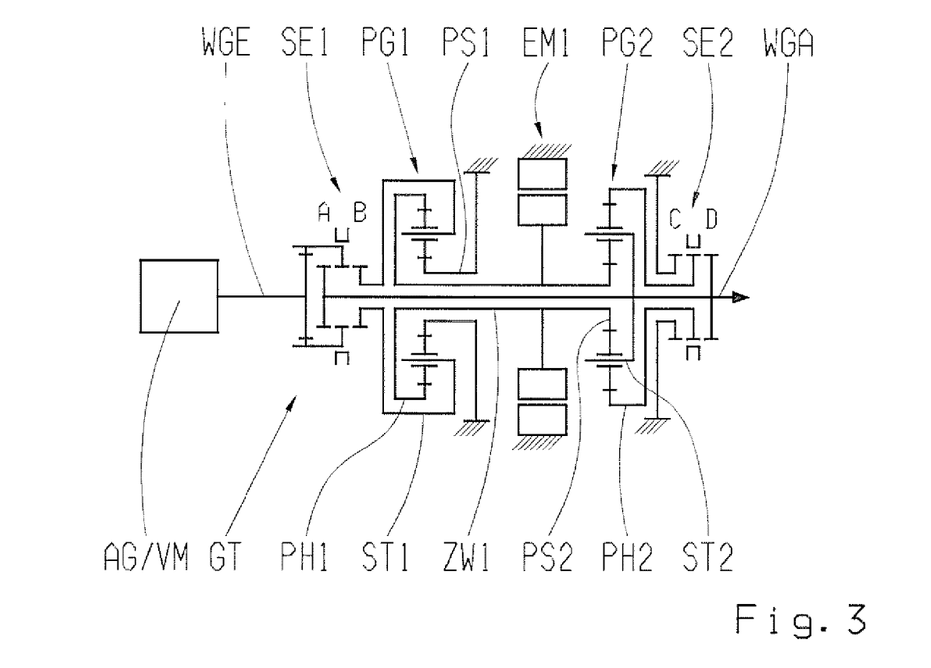
FIG. 3 a diagram of a third transmission according to the invention, together with one internal combustion engine and one electric machine.

In the variation in FIG. 3, in comparison with the variation in FIG. 1, not only the friction clutch RK, but also the electric machine EM2 of the drive assembly AG, are missing, and instead, only the internal combustion engine VM is present in the drive assembly. With a purely electrical operating mode, a shifting at the second shift element SE2, for executing a gear change for the electric machine EM1, is subject to a tractive force interruption.

At low driving speeds, where the first gear of the internal combustion engine VM does not need to be engaged, only a battery-electrical driving mode via the electric machine EM1 is then possible. If the electrical energy storage unit is depleted, a charging of the electrical energy storage unit, with the transmission GT in neutral, is necessary.

Figure 4:
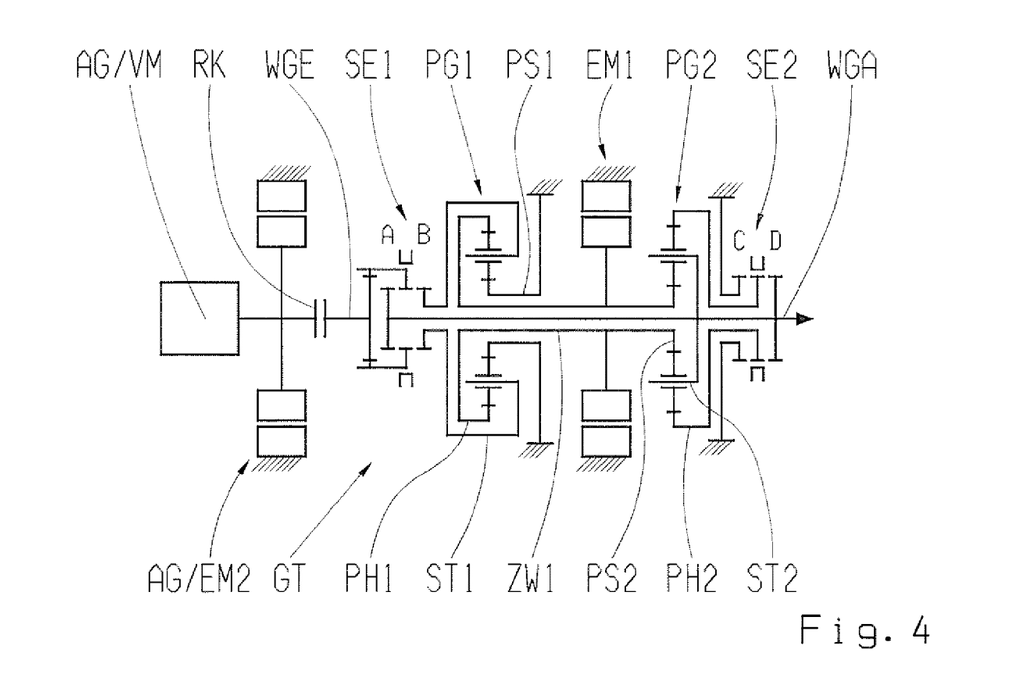
FIG. 4 a diagram of a fourth transmission according to the invention, together with one internal combustion engine and two electric machines.

FIG. 4 shows a variation of the transmission GT according to the invention, in which, in corresponding with FIG. 1, a friction clutch RK and an electric machine EM2 of the drive assembly AG are again present, wherein, however, the friction clutch RK is connected, not only between the transmission input shaft WGE and the internal combustion engine VM, but also between the transmission input shaft WGE and the electric machine EM2 of the drive assembly AG. In this case, when the friction clutch RK is disengaged, both the internal combustion engine VM of the drive assembly AG, and the electric machine EM2 of the drive assembly AG are decoupled from the transmission input shaft WGE. The friction clutch RK enables, accordingly, a decoupling of the internal combustion engine VM while subjected to a load, for example, during an emergency braking operation. Furthermore, the friction clutch RK in the embodiment example in FIG. 4 enables an emergency start-up in the first gear, when the electrical system fails.

Figure 5:
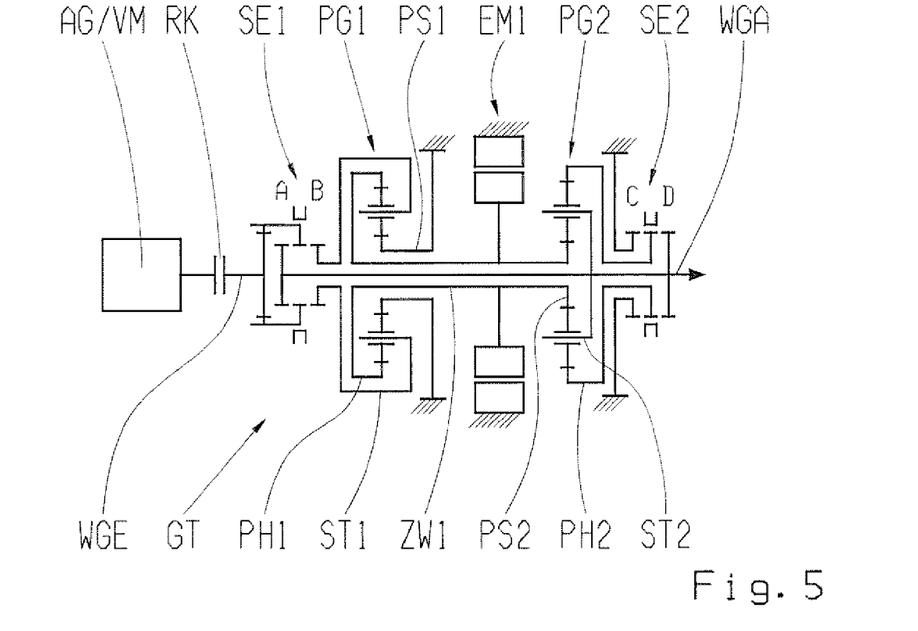
FIG. 5 a diagram of a fifth transmission according to the invention, together with one internal combustion engine and one electric machine.

FIG. 5 shows a variation of the transmission in FIG. 1, in which, although the friction clutch RK is present, the drive assembly AG comprises only the internal combustion engine VM, and not the electric machine EM2. The friction clutch RK enables, in turn, a decoupling of the internal combustion engine VM while subjected to a load, for example, during an emergency braking operation. Furthermore, the friction clutch RK enables an emergency start-up in first gear, when the electrical system fails. Furthermore, the friction clutch RK enables a start-up of the internal combustion engine VM from a purely electrical driving mode, via the electric machine EM1.

Figure 6:
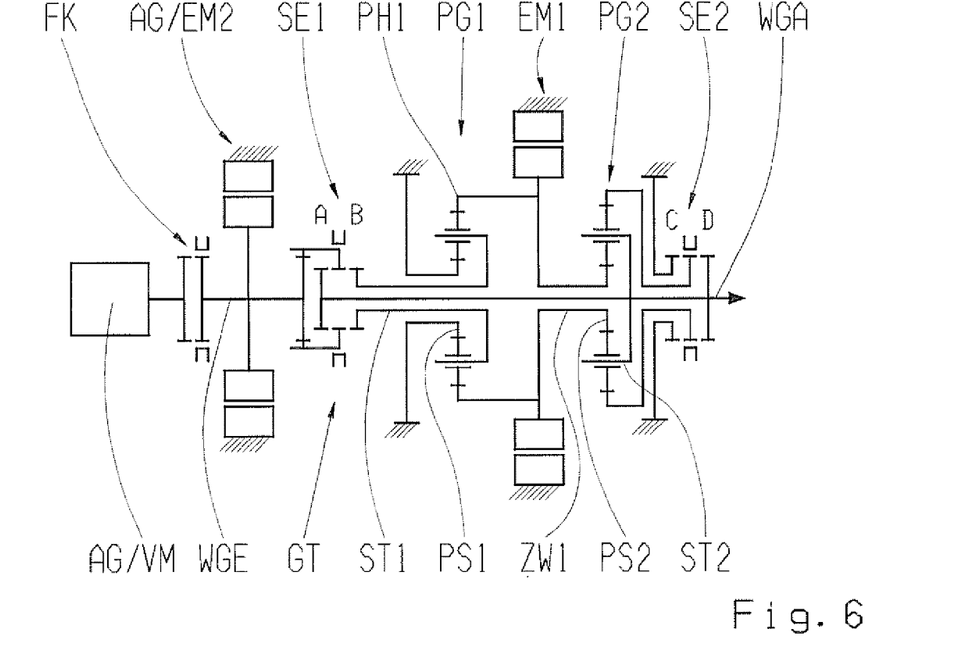
FIG. 6 a diagram of a sixth transmission according to the invention, together with one internal combustion engine and two electric machines.

FIG. 6 shows a variation of the transmission GT in FIG. 1, in which the friction-locking clutch RK, which is connected between the internal combustion engine VM and the transmission input shaft WGE, is replaced by a form-locking clutch, or a form-locking shift element FK.

Furthermore, the embodiment example in FIG. 6 differs from the embodiment example in FIG. 1 in that the first planetary gear step PG1 is rotated, such that the rotor of the electric machine EM1, which is permanently connected to the intermediate shaft ZW1, can cover both planetary gear sets PG1 and PG2, such that an optimization of the structural space is obtained.

In the variation in FIG. 6 as well, the form-locking shift element FK and the electric machine EM1 of the drive assembly AG are optional structural assemblies.

The shifting of the individual elements in the planetary gear steps PG1 and PG2 is identical in the embodiment examples in FIGS. 1-6, such that, with regard to these details of the embodiment examples in FIGS. 2-6, reference is made to the explanations regarding the embodiment example in FIG. 1.

Figure 7:
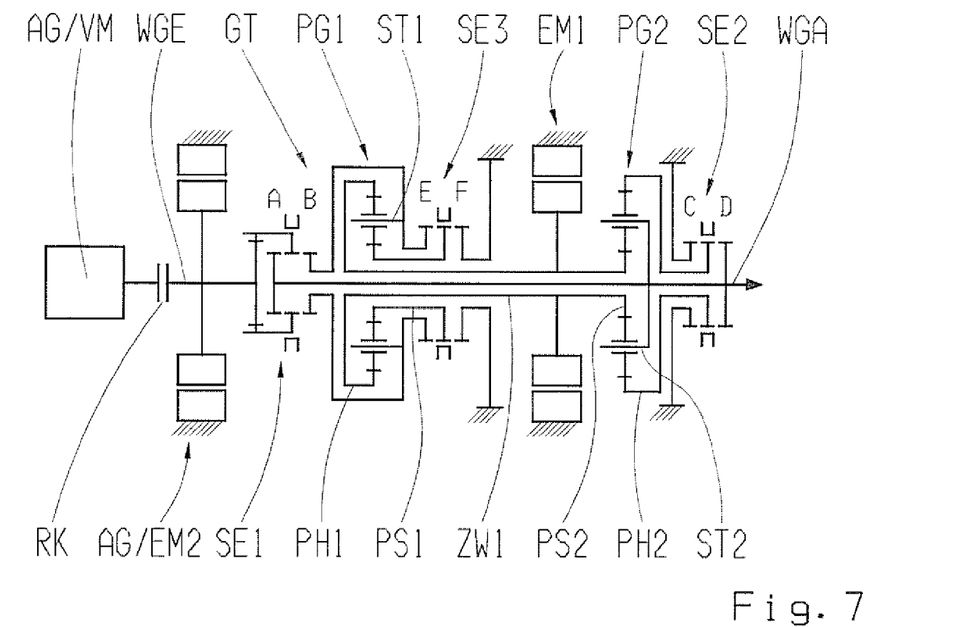
FIG. 7 a diagram of a seventh transmission according to the invention, together with one internal combustion engine and two electric machines.
Figure 8:
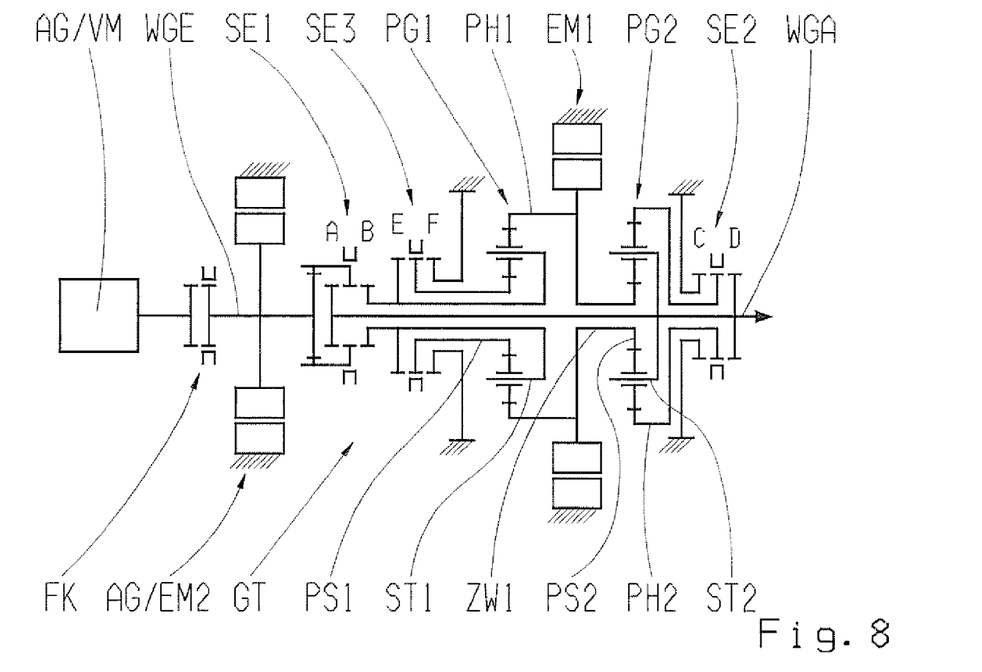
FIG. 8 a diagram of an eighth transmission according to the invention, together with one internal combustion engine and two electric machines.

FIGS. 7 and 8 show two variations of transmissions GT, in which, in addition to the first shift element SE1 and the second shift element SE2, a third shift element is present, by mean of which, in differing from the embodiment examples in FIGS. 1-6, the third element of the first planetary gear step PG1, i.e. the sun gear PS1 of the first planetary gear step PG1, is not permanently connected to the housing, but rather, the connection, via the third shift element PS1, can be switched between a connection firmly connected to the housing, and a connection to the second element of the first planetary gear step PG1, i.e. to the carrier ST1 of the first planetary gear step PG1. As a result, the transmission GT provides, in turn, two gears for the electric machine EM1, and four gears for the drive assembly AG.

By means of the third shift element SE3, which in turn is designed as a double shift element, and has the two engaged shifting setting E and F, as well as a further, neutral, disengaged shifting setting, the third element of the first planetary gear step, specifically the sun gear PS1 of the first planetary gear step PG1, can be shifted back and forth in terms of its connection.

Then, when the first shifting setting F of the third shift element SE3 is engaged, the sun gear PS1 of the first planetary gear step PG1 is connected firmly to the housing.

Then, when the second shifting setting E of the third shift element SE3 is engaged, the sun gear PS1 of the first planetary gear step PG1 is on the carrier ST1 of the first planetary gear step PG1.

When the second shifting setting E is engaged, the first planetary gear step PS1 is bypassed, or in a block cycle, respectively. Then, when the first planetary gear step PG1 is bypassed, the internal combustion engine VM, or the drive assembly AG can use the first gear provided by the second planetary gear step PS2 for the electric machine EM1. By this means, a fourth gear is provided for the drive assembly AG, specifically for the internal combustion engine VM of the drive assembly AG and the electric machine EM2 of the drive assembly AG.

The embodiment examples in FIGS. 7 and 8 differ from one another in that, in FIG. 7, between the internal combustion engine VM of the drive assembly AG and the transmission input shaft WGE, shifting takes place with a friction-locking clutch RK, while in FIG. 8, between the internal combustion engine VM of the drive assembly AG and the transmission input shaft WGE, a form-locking shift element FK is used for shifting.

Another difference between the embodiment examples in FIGS. 7 and 8 is that in the embodiment example in FIG. 8, in comparison to the embodiment example in FIG. 7, the first planetary gear step PS1 is rotated, such that the rotor of the electric machine EM1, which is permanently coupled to the intermediate shaft ZW1, can cover both planetary gear steps PS1 and PS2, which results in an optimization of the structural space being possible.

Advantageous shifting setting combinations for the shifting settings, A, B, C, D, E and F for the form-locking shift elements SE1, SE2, and SE3 in FIGS. 7 and 8, are listed in the following shifting table, as well as the transmission ratios iAG and iEM1 resulting for the drive assembly AG and the electric machine EM1, this being for a numerical example in which the stationary transmission ratio for the first planetary gear step PS1 is $-1.72$ and the stationary transmission ratio i0 for the second planetary gear step PG2 is $-1.5$.

| A | B | C | D | E | F | i-EM1 | i-AG | |
|---|---|---|---|---|---|---|---|---|
| — | x | x | — | x | — | 2.5 | 2.5 | Gear 1 for VM/EM2. EM1 supports tractive force during shifting E-F at shift element SE3. |
| — | x | x | — | — | x | 2.5 | 1.5 | Gear 2 for VM/EM2. EM1 supports tractive force during shifting B-A at shift element SE1. |
| x | — | x | — | — | x | 2.5 | 1.0 | Gear 3 for VM/EM2. F remains, preferably, engaged at SE3, is, however, without load. EM1 synchronizes shifting C-D at shift element SE2. |
| x | — | — | x | — | x | 1.0 | 1.0 | Gear 3 for VM/EM2. F remains, preferably, engaged at SE3, is, however, without load. EM1 supports tractive force during shifting A-B at shift element SE1 |
| — | x | — | x | — | x | 1.0 | 0.63 | Gear 4 for VM/EM2. |
| — | x | — | — | — | x | | | Neutral. VM start-up via EM1 possible. Charging in neutral possible. |

In the above table, the symbol "x" means that the respective shifting setting is engaged, while the symbol "-" means that the respective shifting setting is disengaged.

With the embodiment examples in FIGS. 7 and 8, as well, which comprise two planetary gear steps PG1 and PG2, as well as three shift elements SE1, SE2 and SE3, such that two gears can be provided for the electric machine EM1 and four gears can be provided for the drive assembly AG, the friction clutch RK, or the form-locking shift element FK, respectively, as well as the electric machine EM2 of the drive assembly AG, concern optimal structural assemblies. Likewise, in the examples in FIGS. 7 and 8, the friction-locking clutch RK, or the form-locking clutch FK, respectively, can be disposed such that they are shifted both between the internal combustion engine VM and the transmission input shaft WGE, as well as between the electric machine EM2 and the transmission input shaft WGE, as is shown in FIG. 4 for the friction-locking clutch RK.

In differing from the shiftings of the elements of the planetary gear sets PG1 and PG2 shown in FIGS. 7 and 8, when the shifting setting D at the second shift element SE2 is engaged, the ring gear PH2 can also be coupled to the sun gear PS2. Likewise, when the shifting setting E at the third shift element SE3 is engaged, the sun gear PS1 of the planetary gear step PG1 can also be coupled to the ring gear PH1 thereof. In both cases, this has the effect of a bypassed planetary gear step, which is in a block cycle.

With the transmissions GT of FIGS. 7 and 8, shiftings without interruption of tractive forces are possible, this being at all shift elements SE1, SE2, and SE3. Then, when a shifting between the shifting settings C and D is carried out at the shift element SE2, a drive torque is provided at the transmission output shaft WGA via the drive assembly AG, for providing a shifting without interruption of the tractive forces at the second shift element SE2, specifically via an engaged shifting setting A at the shift element SE1. Then, when a shifting between the respective shifting settings A and B, or E and F, respectively, is to be carried out at the first shift element SE1, or the third shift element SE3, respectively, this can likewise occur without interruption of the tractive forces, wherein the electric machine EM1, permanently coupled to the intermediate shaft ZW1, then provides a drive torque to the transmission output shaft WGA.

The other shiftings of the individual elements of the planetary gear steps PG1 and PG2 is identical in the embodiment examples of FIGS. 1-8, such that, in this regard, for the embodiment examples of FIGS. 7 and 8, reference is made to the explanations for the embodiment example of FIG. 1.

Figure 11:
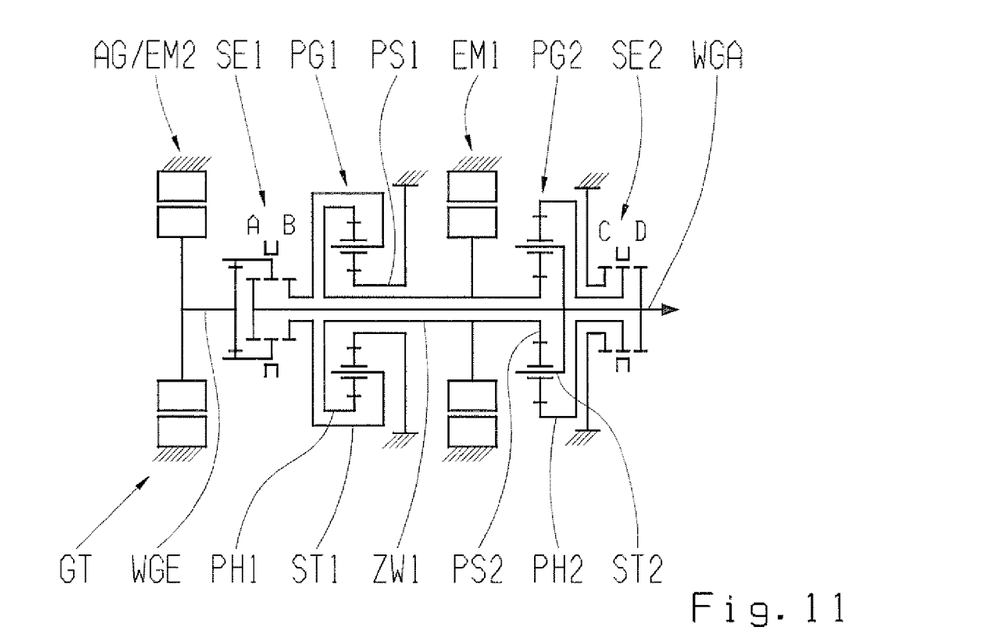
FIG. 11 a diagram of an eleventh transmission according to the invention, together with two electric machines.
Figure 12:
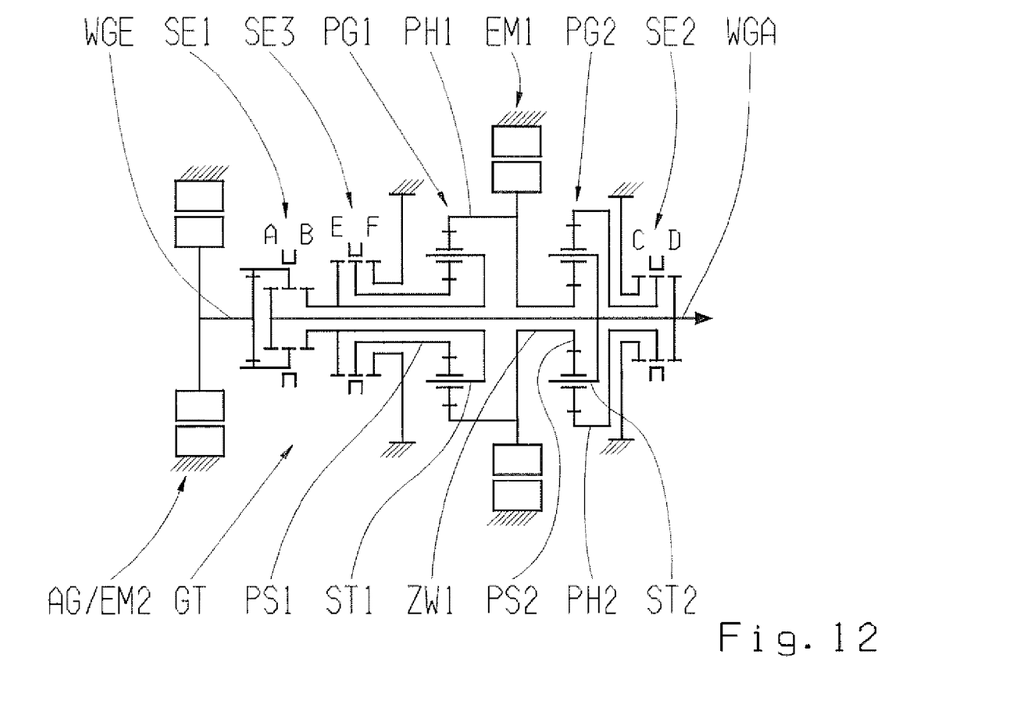
FIG. 12 a diagram of another transmission according to the invention, together with two electric machines.

FIGS. 11 and 12 show variations of the invention, which correspond to the variations in FIGS. 1 and 8, wherein, however, in differing from the variations in FIGS. 1 and 8, the internal combustion engine VM of the drive assembly AG, as well as the friction-locking clutch RK, or the form-locking shift element FK, respectively, are omitted. With regard to all other details, the variations in FIGS. 11 and 12 conform, however, to the variations in FIGS. 1 and 8, such that, in order to avoid repetition, reference is made to the above explanations. The variations in FIGS. 1-8 concern transmissions for hybrid vehicles, wherein the variations in FIGS. 11 and 12 concern transmissions for purely electrical vehicles.

The transmissions GT in FIGS. 1-8, 11 and 12 are all suitable for standard drive train configurations having a coaxial axle drive, in which, thus, the transmission GT is installed in the longitudinal direction of a motor vehicle. For this, according to the above figures, the transmission input shaft WGE and the transmission output shaft WGA are disposed coaxially behind one another, wherein the intermediate shaft ZW1, to which the electric machine EM is permanently coupled, is disposed, at least in sections, coaxially surrounding the transmission output shaft WGA.

Figure 9:
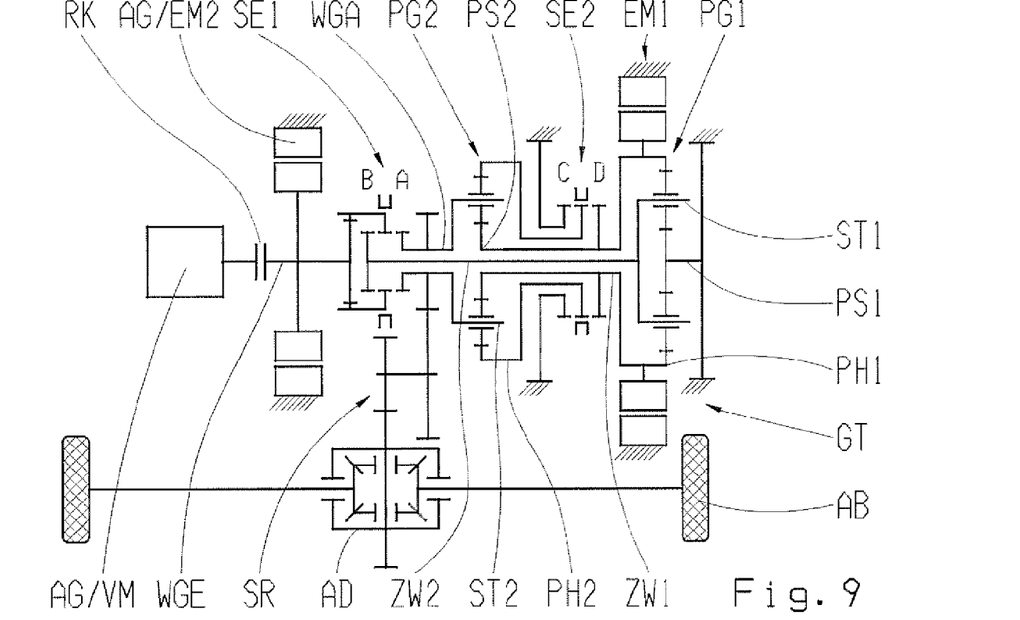
FIG. 9 a diagram of a ninth transmission according to the invention, together with one internal combustion engine and two electric machines.
Figure 10:
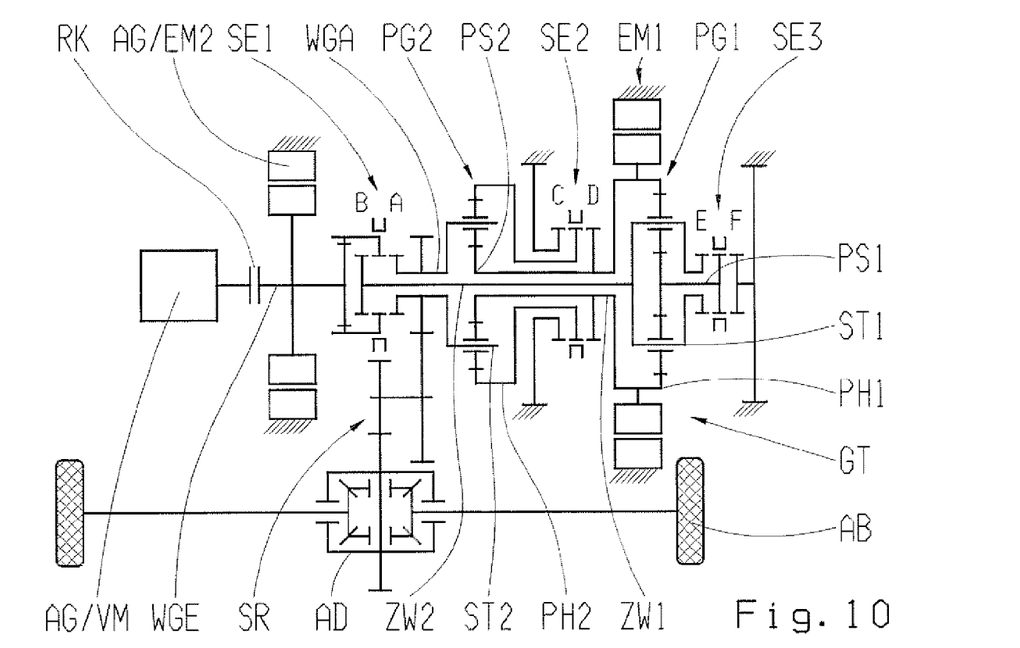
FIG. 10 a diagram of a tenth transmission according to the invention, together with one internal combustion engine and two electric machines.

In contrast to this, FIGS. 9 and 10 show embodiments of transmissions GT, which can be used with a so-called front-transverse drive train configuration. As such, FIG. 9 shows a variation of a transmission GT, which provides two gears for the electric machine EM1, which permanently engages with the intermediate shaft ZW1, and provides three gears for the drive assembly AG, i.e. for the internal combustion engine VM and the electric machine EM2. FIG. 10 shows a variation in which the transmission GT provides two gears for the electric machine EM1 and four gears for the drive assembly AG. In the embodiment example in FIG. 9, the transmission GT comprises, accordingly, two planetary gear steps PG1 and PG2 and two shift elements SE1 and SE2, while the transmission GT in FIG. 10 comprises, in addition thereto, the third shift element SE3.

Regarding the connection of the individual elements of the planetary gear steps PG1 and PG2, and the interaction thereof with the shifting settings of the shift elements SE1, SE2 and, if applicable, SE3, reference is made to the explanations above regarding the embodiment examples in FIGS. 1-8.

In FIGS. 9 and 10, the illustrative configuration of the planetary gear sets PG1 and PG2 is reversed, and at the planetary gear set PG2, when the shifting setting D is engaged and, accordingly, the planetary gear set PG2 is bypassed, the ring gear PH2 is connected to the sun gear PS2, wherein, however, in FIGS. 9 and 10 as well, when the shifting setting D is engaged, the ring gear PH2 can alternatively be connected to the carrier ST2. In any case, when the shifting setting D is engaged, the planetary gear set PG2 is bypassed in a block cycle. In FIG. 10, when the shifting setting E is engaged, as is the case in FIGS. 7 and 8, for bypassing the planetary gear set PG1, the sun gear PS1 is connected to the respective ring gear PH1.

The embodiment examples in FIGS. 9 and 10 differ from the embodiment examples in the other figures in that the transmission output shaft WGA in the embodiment examples in FIGS. 9 and 10 is, at least in sections, disposed coaxially surrounding another intermediate shaft ZW2, wherein the intermediate shaft ZW1 as well, to which the electric machine EM1 is permanently coupled, is disposed, at least in sections, coaxially surrounding the other intermediate shaft ZW2. The other intermediate shaft ZW2 is positioned coaxially behind the transmission input shaft WGE thereby.

As can be derived from FIGS. 9 and 10, the transmission output shaft WGA, which is disposed, at least in sections, surrounding the other intermediate shaft ZW2, is coupled via spur gear steps SR and an axle differential AD for the axle drive AB shown in FIGS. 9 and 10. These spur gear steps SR can provide an additional transmission ratio step.

In the variations in FIGS. 9 and 10 as well, the friction clutches RK concern optimal structural assemblies. It is possible to replace the friction clutch RK with form-locking shift elements, or to entirely omit said clutch. Likewise, the electric machine EM2 of the drive assembly AG concerns an optimal structural assembly. Furthermore, a friction-locking clutch or a form-locking clutch can be coupled, both between the internal combustion engine VM and the transmission input shaft WGE, as well as between the electric machine EM2 and the transmission input shaft WGE.

Because, in the variation in FIG. 10, the third shift element SE3 is disposed on the end of the transmission GT, the transmission GT in FIG. 9 can be easily converted to the transmission GT in FIG. 10, in the manner of a construction kit.

REFERENCE SYMBOLS

A shifting setting
AB axle drive
AD axle differential
AG drive assembly
B shifting setting
C shifting setting
D shifting setting
E shifting setting
EM1 first electric machine
EM2 second electric machine
F shifting setting
FK form-locking shift element
GT transmission
PG1 first planetary gear set
PG2 second planetary gear set
PH1 ring gear of the first planetary gear set
PH2 ring gear of the second planetary gear set
PS1 sun gear of the first planetary gear set
PS2 sun gear of the second planetary gear set
RK friction-locking clutch
SE1 first shift element
SE2 second shift element
SE3 third shift element
SR spur gear step
ST1 carrier of the first planetary gear set
ST2 carrier of the second planetary gear set
WGE transmission input shaft
WGA transmission output shaft
VM internal combustion engine
ZW1 first intermediate shaft
ZW2 second intermediate shaft

The invention claimed is:

1. A transmission for a motor vehicle, the transmission comprising:
a housing;
a transmission input shaft operable to couple to and decouple from a drive assembly of the motor vehicle;
a transmission output shaft operable to couple to and decouple from an axle drive of the motor vehicle;
a first element of a first planetary gear set permanently coupled to a first element of a second planetary gear set via a shiftable intermediate shaft between the transmission input shaft and the transmission output shaft, wherein the second planetary gear set is disposed on a same axis as the first planetary gear set;
an electric machine permanently coupled to the intermediate shaft;
a second element of the second planetary gear set permanently coupled to the transmission output shaft;
a first form-locking shift element of the transmission input shaft operable to shift between a first and second shift setting of the first form-locking shift element, wherein, in the first shifting setting of the first form-locking shift element, the transmission input shaft is coupled directly to the transmission output shaft and, in the second shifting setting of the first form-locking shift element, the transmission input shaft is coupled to a second element of the first planetary gear set;
a second form-locking shift element of the transmission output shaft operable to shift between a first and second shift setting of the second form-locking shift element, wherein, in the first shifting setting of the second form-locking shift element, a third element of the second planetary gear set is firmly attached to the housing and, in the second shifting setting of the second form-locking shift element, the third element of the second planetary gear set is coupled to the second element of the second planetary gear set or to the first element of the second planetary gear set so as to bypass the second planetary gear set.

2. The transmission of claim 1, wherein the drive assembly comprises an internal combustion engine or a second electric machine.

3. The transmission of claim 2, wherein the drive assembly is operable to couple to and decouple from the transmission input shaft via a friction-locking clutch or a form-locking shift element.

4. The transmission of claim 1, wherein the drive assembly comprises a second electric machine, and wherein the second electric machine is permanently coupled to the transmission input shaft or is operable to couple to and decouple from the transmission input shaft via a friction-locking clutch or a form-locking shift element.

5. The transmission of claim 1, wherein a third element of the first planetary gear set is permanently attached to the housing, such that the transmission provides two gear ratios for the electric machine and three gear ratios for the drive assembly.

6. The transmission of claim 1, further comprising a third form-locking shift element operable to shift between a first and second shift setting of the third form-locking shift element, wherein, in the first shifting setting of the third form-locking shift element, a third element of the first planetary gear set is firmly attached to the housing, and wherein, in the second shifting setting of the third form-locking shift element, the third element of the first planetary gear set is coupled to the second element of the first planetary gear set or to the first element of the first planetary gear set, so as to bypass the first planetary gear set and such that the transmission provides two gear ratios for the electric machine and four gear ratios for the drive assembly.

7. The transmission of claim 1, wherein each of the first and second form-locking shift elements comprises a double shift element operable to shift among a third, neutral, and disengaged shifting setting.

8. The transmission according claim 1, wherein when the drive assembly provides a tractive force to the transmission output shaft, the second form-locking shift element is configured to shift between the first shifting setting of the second form-locking shift element and the second shifting setting of the second form-locking shift element without interruption of the tractive force.

9. The transmission of claim 1, wherein when the electric machine provides a tractive force to the transmission output shaft, the first form-locking shift element is configured to shift between the first shifting setting of the first form-locking shift element and the second shifting setting of the first form-locking shift element without interruption of the tractive force.

10. The transmission of claim 1, wherein the transmission input shaft and the transmission output shaft are disposed on the same axis, and the intermediate shaft coaxially surrounds at least a portion of the transmission output shaft.

11. The transmission of claim 1, further comprising a second intermediate shaft disposed on the same axis as the transmission input shaft, wherein the transmission output shaft coaxially surrounds at least a portion of the second intermediate shaft, and wherein the intermediate shaft coaxially surrounds the second intermediate shaft.

12. The transmission of claim 1 further comprising a drive assembly coupled to the transmission input shaft.

\* \* \* \* \*